Jan. 8, 1935.  H. STIBBS  1,987,034

BEARING

Filed Feb. 10, 1931

INVENTOR
Harry Stibbs.
BY
Floyd M. Harris
ATTORNEY

Patented Jan. 8, 1935

1,987,034

UNITED STATES PATENT OFFICE 1,987,034

BEARING

Harry Stibbs, Vandalia, Ohio

Application February 10, 1931, Serial No. 514,799

5 Claims. (Cl. 308—187)

My invention relates to bearings and particularly to bearings which are designed for use in ovens or the like where the bearings are subjected to high temperatures.

In large ovens which are employed for baking enamel on such objects as automobile fenders or for heating objects to high temperatures for other purposes, the objects are usually moved slowly through the oven by means of a conveyor, usually a conveyor of the mono-rail type. The conveyor chain is supported at each turn by means of an idler wheel.

In the past, great difficulty has been encountered in obtaining a bearing for the idler wheel that would operate at the required high temperatures. This difficulty has been caused by the expansion and warping of the bearing parts and also by relative movement between the bearing supports as a result of the expansion of the supporting structure.

Furthermore, lubricating oil has a tendency to carbonize at high temperatures and tighten the bearing.

An object of my invention is to provide a liquid-cooled bearing of the above-mentioned type for idler wheels or other rotatable parts subjected to high temperatures.

A further object of my invention is to provide a bearing of the above-mentioned type which will not bind when the supporting members get out of alignment.

In practicing my invention, I provide the upper side of the idler wheel with a liquid-tight cup-shape portion in which a self-aligning ball bearing is mounted. The idler wheel is further supported by means of a second self-aligning bearing mounted in a cup-shape member supported beneath the idler wheel.

Figure 1:
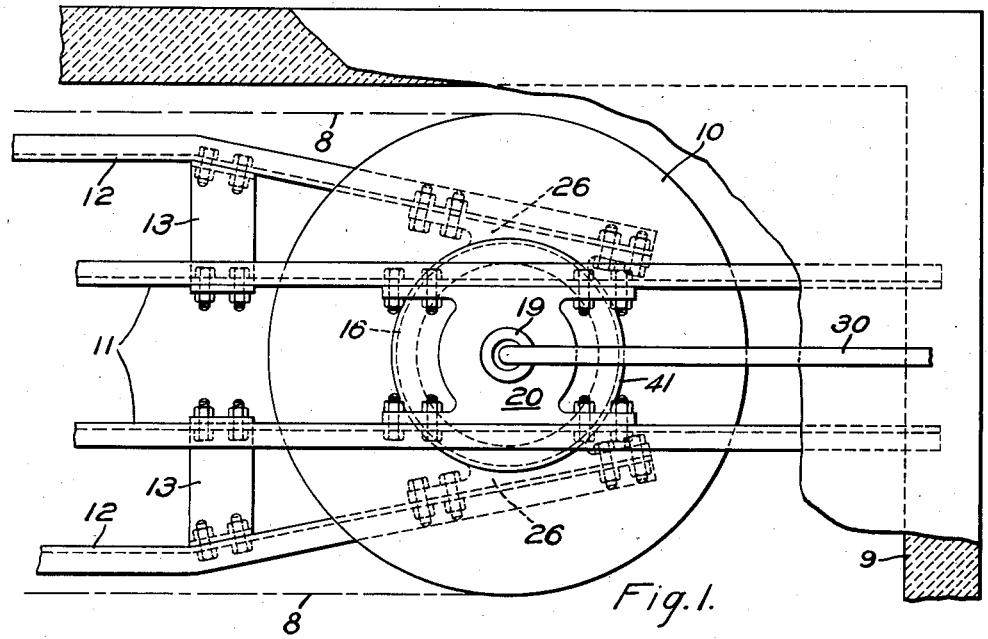

Other features and advantages of my invention will appear from the following description taken in connection with the following drawing in which, Figure 1 is a plan view of a portion of an oven structure and of an idler wheel which is supported by means of a bearing constructed in accordance with my invention.

Figure 2:
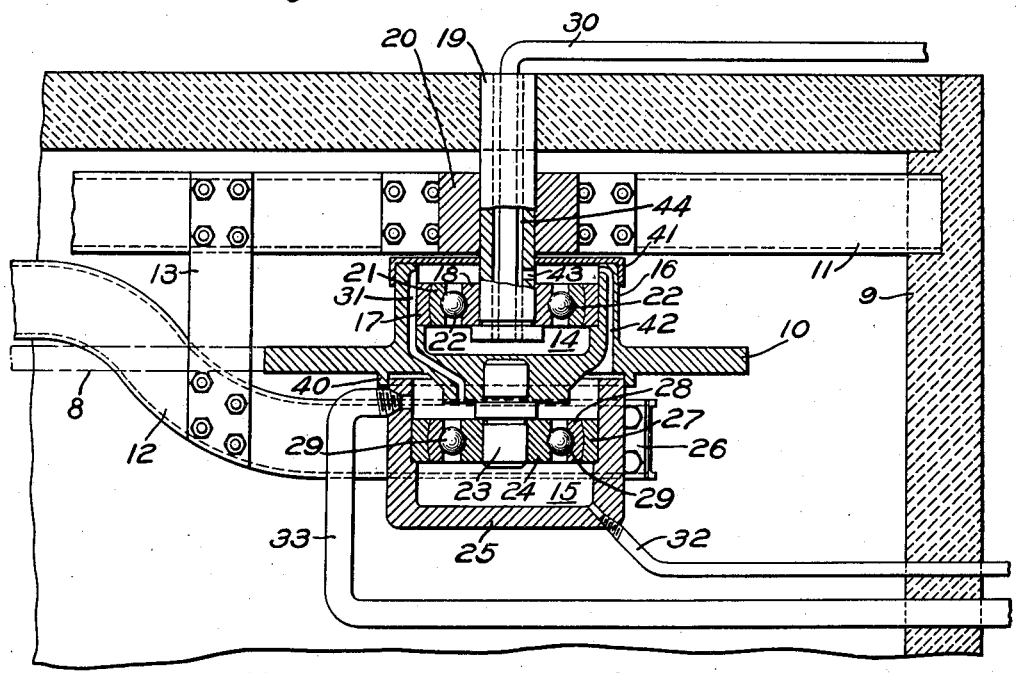

Fig. 2 is a side view, partly in section, of the structure shown in Fig. 1.

Referring to the drawing, the oven, in which the idler wheel 10 is supported, comprises an oven wall 9 and the supporting beams 11. The channel irons 12 which are provided as part of the supporting structure for the wheel 10 are supported from the upper part of the oven structure at their left-hand ends (not shown). They are further supported from the beams 11 by means of the members 13 which are bolted or otherwise fastened to the channel irons 12 and beams 11.

The idler wheel 10 is supported between the beams 11 and the channel irons 12 by means of the two self-aligning ball bearings 14 and 15, the bearing 14 being supported from the beams 11 and the bearing 15 being supported from the channel irons 12. Because of the two self-aligning bearings, the idler wheel 10 will rotate freely even though the oven structure is warped so that the position of the channel irons 12 with respect to the beams 11 is changed. The drive chain which is in contact with the idler wheel 10 is indicated by the broken line 8.

The supporting structure for the bearing 14 includes a cup-shape portion 16 on the upper side of the idler wheel 10 in which the bearing 14 is mounted. The outer ring 17 of the bearing 14 is fastened to the inner wall of the cup 16. The inner ring 18 of the bearing 14 is mounted on a pin 19 which is fitted into a block 20 bolted to the beams 11. The pin 19, which extends through the top of the oven, has a hole drilled through the center thereof to admit a pipe which supplies cooling fluid to the bearing 14. The pin 19 and block 20 hold the inner bearing ring 18 rigid with respect to the top of the oven.

A self-aligning ring 21 having a curved outer surface is fitted into the outer bearing ring 17 and ball bearings 22 are held between the self-aligning ring 21 and the inner ring 18.

The lower side of the idler wheel 10 is supported by means of a pin 23 which fits tightly into the bottom of the wheel. The lower end of the pin 23 fits tightly into the inner ring 24 of the ball bearing 15.

The ball bearing 15 is mounted inside a cup-shape support 25 having feet 26 which are bolted to the channel irons 12. The outer ring 27 is fitted tightly into the cup-shape support 25 and a self-aligning ring 28 and ball bearings 29 are held between the inner ring 24 and outer ring 27 as described above.

The bearing structure is cooled as follows: The water or other cooling fluid is fed from the pipe 30 through the pin 19 to the cup portion 16 inside the oven. As the cup portion 16 fills with water, the water passes between the ball bearings 22 and flows out of the cup 16 through the passageway 31 in the cup 16 and idler wheel 10.

The water flows from the passageway 31 to the lower bearing 15. It then passes from the cup 25 to a point outside the oven through a drain pipe 33.

Additional cooling fluid for the bearing 15 is supplied from the pipe 32. It also leaves the bearing through the pipe 33.

Steam generated in the bearing structure is prevented from entering the oven by means of a flange 40 at the bottom of wheel 10 which acts as a cover for the cup 25 and by means of a cover 41 on the cup portion 16.

Steam generated in the cup 25 leaves by way of the passage 42. This steam together with that generated in cup 16 leaves the oven through the opening 43 and the space 44 between the pin 19 and pipe 30.

The term "ball bearings" as used in the claims includes both ball bearings and roller bearings.

Various modifications may be made in my invention without departing from the spirit and scope thereof, and I desire, therefore, that only such limitations shall be placed thereon as are imposed by the prior art and are set forth in the appended claims.

I claim as my invention:

1. Supporting structure for a rotatable element subjected to high temperatures comprising a cup-shape portion on the top of said element, a self-aligning bearing mounted in said cup-shape portion for supporting the upper side of said element, a cup-shape support positioned below said rotatable element, a self-aligning bearing mounted in said cup-shape support for supporting the lower side of said element, and means for supplying a continuous flow of cooling fluid to said bearings.

2. An idler-wheel for an oven conveyor chain comprising a wheel rotatably mounted on a vertical axis, a cup-shape element on the top of said wheel and integral therewith, a cup-shape element below said wheel, said rotatable mounting including a self-aligning ball bearing located within said first cup-shape element and a second self-aligning bearing located within said second cup-shape element, means for supplying a substantially continuous flow of cooling liquid to said bearings, and means for preventing said cooling liquid from completely filling said cup-shape elements.

3. Supporting structure for a rotatable element subjected to high temperatures comprising a cup-shape portion on the upper side of said element, means comprising a ball bearing mounted in said cup-shape portion for supporting said element, means for supplying a continuous flow of cooling liquid to said bearing, said last means including a cooling liquid inlet having its inlet opening located below said ball-bearing and a cooling liquid outlet having its outlet opening located above said bearing, the passage-way of said outlet being located in the wall of said cup-shape portion, a second ball bearing for supporting said rotatable element, said second bearing being mounted in a cup-shape element positioned below said rotatable element and beneath the outlet opening of said passage-way whereby the cooling liquid flows from said first cup-shape portion into said second cup-shape portion.

4. Supporting structure for a rotatable element subjected to high temperatures comprising a cup-shape portion on the upper side of said element, a cup-shape portion located below said element, a ball bearing mounted in said first cup-shape portion, a second ball bearing located in said second cup-shape portion, and means for maintaining both of said bearings immersed in a continuous flow of fresh cooling liquid.

5. In an oven having an element therein rotatable about a vertical axis, said element having a cup-shape portion on the top thereof, a self-aligning ball bearing located in said cup-shape portion for supporting said element, said self-aligning ball bearing being supported from a shaft secured to structural members at the top of the oven, a short vertical shaft extending from the bottom of said first element and having a self-aligning ball bearing secured thereto, means for supporting said second ball bearing comprising a second cup-shape portion within which said ball bearing is positioned, said second cup-shape portion being secured to other structural members in said oven, and means for keeping said cup-shape portions sufficiently filled with a continuous flow of cooling liquid to immerse said bearings.

HARRY STIBBS.